United States Patent [19]

Epstein et al.

[11] Patent Number: 4,951,444
[45] Date of Patent: Aug. 28, 1990

[54] MULTI-STATION DIE-LESS PACKAGING MACHINE

[75] Inventors: Moshe Epstein, Olympia Fields; Paul Durden, Bellwood, both of Ill.

[73] Assignee: Durden to A.M.E. Engineering, Inc., South Holland, Ill.

[21] Appl. No.: 306,683

[22] Filed: Feb. 6, 1989

[51] Int. Cl.⁵ .................... B65B 47/02; B65B 57/00
[52] U.S. Cl. .................................... 53/77; 53/64; 53/433; 53/508; 53/559
[58] Field of Search ............... 53/55, 77, 64, 453, 53/559, 471, 508, 507, 433, 432, 511, 510, 52

[56] References Cited

U.S. PATENT DOCUMENTS

| | | | |
|---|---|---|---|
| 3,745,739 | 7/1973 | Madesn et al. | 53/22 A |
| 4,034,536 | 7/1977 | Mahaffy et al. | 53/22 A |
| 4,064,676 | 12/1977 | King et al. | 53/77 |
| 4,172,347 | 10/1979 | Nitz | 53/52 |
| 4,229,927 | 10/1980 | Day | 53/433 |
| 4,265,070 | 5/1981 | Mainberger et al. | 53/433 |
| 4,294,859 | 10/1981 | Lundquist et al. | 426/410 |
| 4,471,599 | 9/1984 | Mugnai | 53/434 |
| 4,506,488 | 3/1985 | Matt et al. | 53/55 |
| 4,516,210 | 5/1985 | Dahlke | 364/471 |
| 4,517,784 | 5/1985 | Beckett | 53/75 |
| 4,535,582 | 8/1985 | Jones | 53/52 |
| 4,553,376 | 11/1985 | Okada et al. | 53/511 |
| 4,558,178 | 12/1985 | Yasuda et al. | 179/2 E |
| 4,614,076 | 9/1986 | Bathemacher | 53/433 |
| 4,627,225 | 12/1986 | Faller et al. | 53/510 |
| 4,642,239 | 2/1987 | Ferrar et al. | 426/396 |
| 4,662,155 | 5/1987 | Chasman | 53/433 |
| 4,683,704 | 8/1987 | Vorachek et al. | 53/77 X |

OTHER PUBLICATIONS

"Tiromat CS 325" Vacuum Packaging Machine brochure; Kramer & Grebe GmbH & Co.
"Tiromat CS" Automatic Vacuum Packaging Machine brochure; Kramer & Grebe GmbH & Co.
"DixieVAC 2400" Vacuum Packaging Machine brochure; Dixie Union Verpackungen GmbH.
"Verpa" Automatic Packaging Machine brochure; Verpa Verpackungmaschinenbau GmbH.
"Multivac R80" Automatic Packaging Machine brochure; Koch, Kansas City, Missouri.

Primary Examiner—James F. Coan
Attorney, Agent, or Firm—Milton S. Gerstein; Marvin N. Benn

[57] ABSTRACT

A new computerized control system designed for packaging machines. This control system can be installed on any dieless packing machine. The advances achieved by this control system are: High speeds are achieved by synchronizing the machine index cycle and tooling controls, permitting the prestart of tooling before the end of the index cycle; because the motor speed is monitored and profiled by the computer continuously, faster machine speeds can be achieved while maintaining the minimum machine jerk; total index time savings; diagnostics which dramatically reduce machine down time as a user friendly hard-copy print out is produced describing and pinpointing locations of malfunctions in the timers, tooling, and motor performance; access to all timer control settings through easy to use thumbwheel switches. In addition, a new arrangement of the tooling stations is used, allowing for the increase of per cycle capacity several times the capacity of the prior art. The sealing station includes an initial sealing substation where no vacuum operation is performed, and a final sealing substation where a vacuum operation of considerably reduced requirements of time is carried out.

20 Claims, 12 Drawing Sheets

```
******************************************************************
*    SELECTED     : CONTROL SWITCH YOU CAN PRESS AFTER THE        *
*  MACHINE MODE   : SELECTED MACHINE MODE                         *
*                 :------------------------------------------------*
*                 : EMERGENCY-STOP : JOG : RESET : START : STOP   *
*-----------------:----------------:-----:-------:-------:--------*
* EMERGENCY-STOP  :                :     :   X   :       :        *
*-----------------:----------------:-----:-------:-------:--------*
* JOG             :        X       :  X  :   X   :       :        *
*-----------------:----------------:-----:-------:-------:--------*
* RESET           :        X       :  X  :   X   :   X   :        *
*-----------------:----------------:-----:-------:-------:--------*
* START           :        X       :     :       :       :   X    *
*-----------------:----------------:-----:-------:-------:--------*
* STOP            :        X       :  X  :   X   :   X   :        *
******************:****************:*****:*******:*******:********
```

MOTOR JOG-3 DIAGRAM

MULTI-STATION DIE-LESS PACKAGING MACHINE

BACKGROUND OF THE INVENTION

Since the invention of vacuum packing and plastic film packaging, the food preparation industry has grown in leaps and bounds regarding the variety of products that can be offered to consumers. Prior to this, food marketing was very limited due to food spoilage, and limited the variety of forms products could be presented. For example, a customer ordered the butcher to slice cold cuts or meats rather than purchasing presliced meats from a grocery's refrigeration section. One was also limited to the types of food products available. Modern methods of packaging have greatly extended the life of these products, and some remain fresh for weeks and months under refrigeration. With the modernization of these packaging techniques, the machinery has also changed tremendously.

The first type of machinery built to perform such packaging was the "Die-Train" machine. In this machine, a multitude of metal molds or dies move in circular motion, similar to a conveyer belt, across the various work stations, where different operations are performed. Each film-pack remains in its mold until the final station, when the circuit of molds returns to the beginning of the machine, and the products exits the system. The drawback to this machine is when a different product is desired and all of the several dozen molds have to be removed and replaced with the molds.

A later type, which is more frequently used, is the "Die-Less" machine. As the name implies, this machine operates without cycling a plurality of dies in the circuit of the machine, but rather indexes the plastic tray-film along the work stations of the machine, and simply moving the molds and vacuuming apparatus up to the film at each station, as required. Thus, only one master molding-tool is required at each station. Such a prior-art machine is that manufactured by Tiromat, which is a die-less packing machine. At the beginning of the cycle of this machine, the plastic film is unwound onto the machine in advance of the "forming station". At the forming station, the tooling rises and heats plastic film to make it deformable. A vacuum is then created to suck the soft film into the mold, thus assuming the form desired for the package for the given product. The tooling is then lowered out of the way, and the film advanced to the next station, which is the loading station, where the product is loaded into the packages, either manually or by automated equipment. The next station is the sealing station. Here, the tooling rises and surrounds the package in an enclosed chamber to which is then applied a vacuum, removing all air from the entire chamber to form the final product, after which the upper film is lowered over the product and heat-sealed along the perimeter of the package. The vacuum is then vented, the tooling lowered, and the machine indexed again. Cutter knives cut the connected packages into the individual product packages.

As in all industrial settings, there is the continual desire to make the given process faster, cheaper, and more efficient. This is not, of course, as easy as installing a faster motor. Motor speed is already a parameter limited by the avoidance of "machine jerk" (too sudden acceleration of film movement causing various operational disorders such as the spilling of the product out of the package). Also, overall speed is limited by the rate at which the tooling rises and lowers, and the time required for the tooling to do its job at each of the respective stations.

Another place one might look to increase productivity is at the tooling stations. The prior art machines are multiple mold units, usually with several molds along the width of the machine, and, frequently, with a plurality of such rows. For example, four balognas would fit widthwise along the machine, and with two such rows, for a total of eight units. This would amount to eight packages of product being produced in each cycle or index of the machine operation. Therefore, in order to optimize machine efficiency, one might think that it is as simple as increasing the size of the master mold: make instead of two rows of four, in this example, five rows, for a total of twenty units per index, and thusly, increase the productivity by 150%. But this is entirely unfeasible. Such a mold would weigh nearly 300 pounds. The present machine element for raising and lowering the tools would be insufficient. To install a larger apparatus would not solve the problem, as the speed of the movement of the tooling would suffer, canceling out the gain in products per cycle. In addition, there is the requirement that the molds be interchangeable. This is necessary in that the same machines are used for a multitude of different products. When a run of bologna, for example, is finished, packages of beef stick, for example, may be run, which is simply accomplished by removing the mold with bologna-package-shaped mold and replacing it with the beef-stick-mold. However, a 300 pound mold is altogether too unwiedly to be used in this manner.

SUMMARY OF THE INVENTION

The present invention is directed to any Die-Less machine, such as the Tiromat and Multivac. By means of the modification of certain parts of the former system and the introduction of new components, overall efficiency is greatly increased.

The present invention incorporates a computerized control system to control the machinery, such as INTEL 80/24. This computer controls and monitors all of the tooling, timer, the motor, and various switches. By means of the computer very closely controlling the motor operation, the highest possible speeds can be incorporated with the avoidance of machine-jerking accelerations. The computer incorporates the use of EPROM firmware, eliminating the possibility of loss of machine programming and eliminating any need for machine reprogramming due to power outages etc. In addition, the computer will be in constant surveillance of the precise locations and activities of all the tooling and of the motor's index position, and will be able to detect errors therein, allowing for prompt correction. To this end, the system incorporates a hard-copy printer, such as an APP-48, upon which will be printed at request a listing of the current machine settings, as well as user-friendly diagnostics to inform the operators of the precise reason for any machine failure and the instructions required to accomplish a fix.

Another novel facet of the control unit is its thumbwheel switch boards. These boards of thumbwheel switches are the operator's way of entering the operational parameters into the system. These parameters define the exact timing and ordering of the tooling to produce the desired packaging. These settings will be different for each type of product on the machine, as the size and sequences of operations will vary. The advantage of this is the ease and simplicity for production workers who may not be sufficiently oriented with electronic equipment to be able to communicate with the computer by means of any sort of terminal or other electronic means. Subsequently, the system can be operated by a novice without the need for specially trained personnel or for summoning a technician.

Conventional Die-Less machines have two phases: The index cycle, and the timer phase. During the index cycle, the motor advances the plastic film across the length of the machine the prescribed length for the given line of production. At the halt of the indexing operation, the timer phase begins by starting the upward motion of the tools to their top-dead-center position at which time their operations may commence. At the finish of the operations, the tools are lowered. When the lowering of the tools is completed, and they are at their bottom-dead-center position, the timer phase concludes and the next machine index takes place. But the shallower, or less deep, is the given mold for the product being packaged, the more time is wasted. This is due to the obvious fact that there is in theory no reason why the machine indexing cannot take place once the tools have lowered enough that the formed packs, if indexed, would be able to merely clear the tools. It is not intrinsically required for the sake of the product that machine indexing wait until the tools reach bottom-dead-center as the current art operates. Similarly, the tools may begin their ascent to the top-dead-center position prior to the halt of movement of the machine index, so long as they will not ascend too soon, in order to avoid the contact with moving product package-forms. Such reduction of wasted time is accomplished by the present invention by providing the computer with the time at which it is possible to activate the tooling. To give an example of the efficiency achievable, the current invention has been successfully installed on a number of systems. On one such system, a setup with a 14" index has achieved a rate of 23 cycles per minute, and increase of nearly two thirds over the conventional machines, which cannot exceed 14 cycles per minute under the same conditions. According to the invention, instead of using one mold of, for example, four balognas on the width of the machine and five such rows, for twenty units per cycle, the present invention utilizes five single rows of four-across balognas molds, each a different, individual piece. Thus, the machanism is capable of elevating the molds easily, and the molds themselves are not unreasonably weighted insofar as human handling is concerned. Since, however, each mold has some overhead space required on either side, the five row-molds would not be able to be juxtaposed next to each other without leaving gaps of unused film therebetween. To alleviate this problem, the five molds are situated in a staggered fashion, in effect establishing two package-forming work-stations on the machine. Another enhancement of the present invention is the substitution of the single sealing station of the prior-art apparatuses, with a pair of sealing stations, one an initial seal and one a final seal, which increases the overall productivity of the apparatus of the invention. An example of such increased productivity may be gauged by way of example. A conventional apparatus may have two rows of four-across molds, for example), or eight parts per cycle. Such a machine may be running at approximately 15 machine-cycles per minute. Hence, this system will produce 120 parts per minute. The present invention is operational at speeds of up to 30 cycles per minute. In the example of five rows of four units widthwise or twenty units per cycle, one we would produce 600 parts per minute! Thus, one machine outfitted with the current invention will be able to do the work of several machines not so outfitted—resulting in highly cost-efficient product output.

BRIEF DESCRIPTION OF THE DRAWINGS

The invention will be more readily understood with reference to the accompanying drawings, wherein.

DETAILED DESCRIPTION OF THE INVENTION

The description herein defines a system custom designed for a product packaging machine with an index length of 11 inches and running at about 30 cycles per minute. These parameters may be varied, of course, with each installation, but the principals arre generally applicable to any machine. Also, the principles of the current invention can be applied to any type of tooling machinery. Also, the principles of the current invention can be used for any type of tooling machinery, not just forming tools, vacuum-forming tools, sealing tools, and the like. Also, the invention is equally applicable for vacuum packing as well as "gas flushing", the process whereby the pack is filled with any of a number of types of gas for packaging advantages. The invention applies to air or hydraulic activated devices for raising and lowering of the tooling. In actuality, the tooling and all related functions are generic to the control unit.

As shown in FIGS. 4-7, the present invention has a front control panel and the switches included thereon. There are sixteen front-panel switches, their locations being depicted in FIG. 4. Of these sixteen, there are five manual operator control switches: Emergency Stop (immediately halts all machine operations), Jog (to enter machine's jog mode described in detail later), Reset (described later), Start, and Stop; and there are eleven manual off/on switches: power (manual off/on control switch for bottom web film guild, code dated heating element, motor amplifier and temperature controllers), seal-heater (manual off/on switch for seal-heater), forming-heater (manual off/on switch for forming heater), cross-cutter (manual off/on override of the computer cross-cutter output signal), slitter knives (manual override of computer output signal to slitter knives relay, film-retard (manual override of computer upper film retard output signal), conveyer(manual override of the computer discharge conveyer output signal), forming-tool up (manual override of computer upper film retard output signal), seal-tool up (override of computer sealing tool-up signal), printer (manual control for APP-48 hard-copy printer), and code-dater (manual override of the computer code dater output signal), and more may be added if required.

Figure 5:
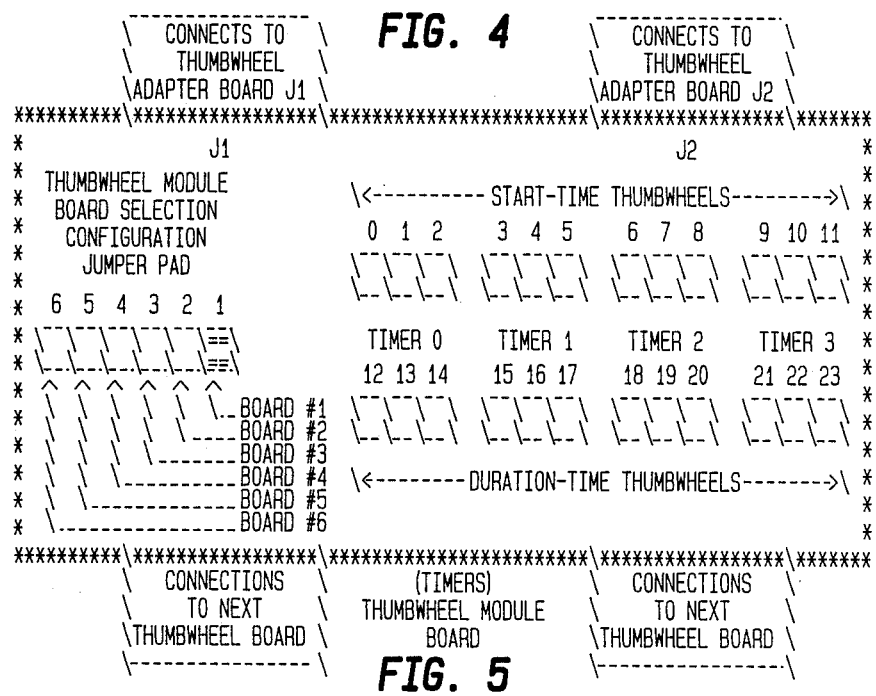
FIG. 5 shows a timer-thumbwheel module board.
Figures 6, 8:
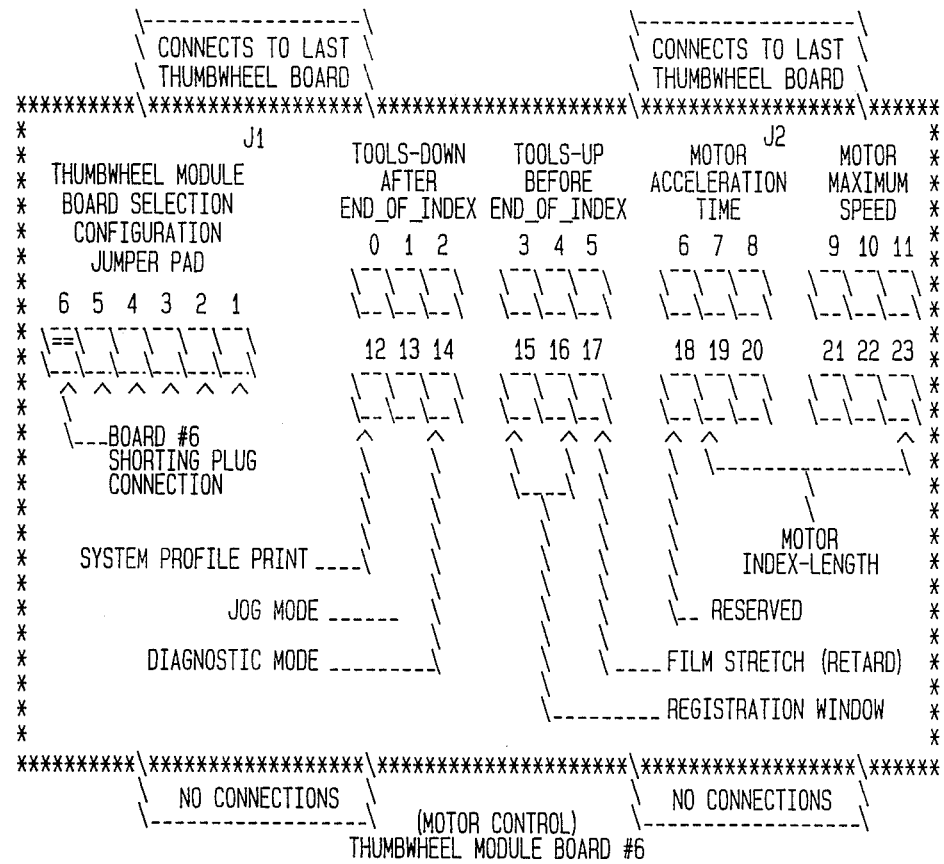
FIG. 6 depicts the motor thumbwheel module board.
FIG. 8 is a table showing the possible control panel switches that can be used at any given stage of machine operations.
Figure 7:
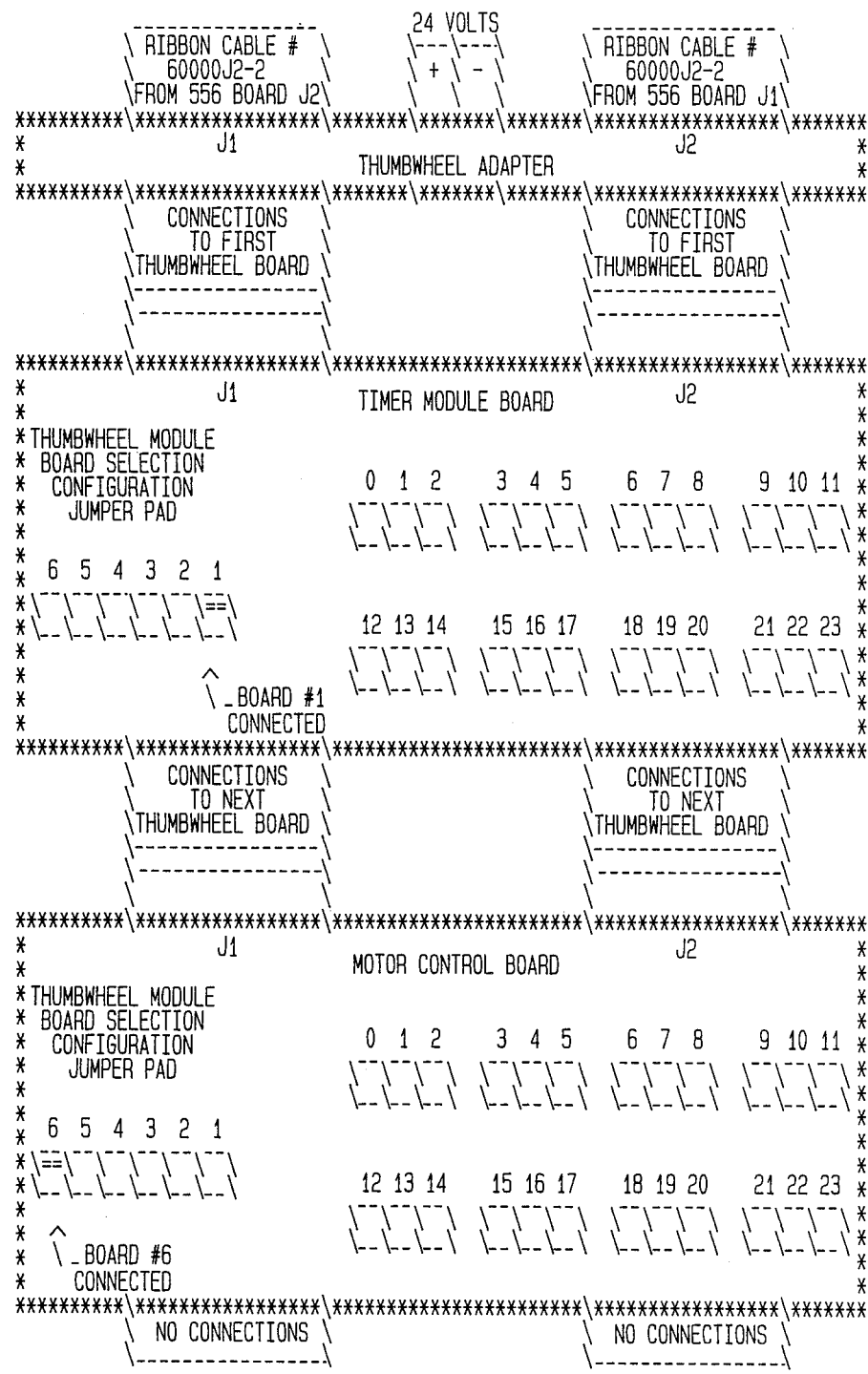
FIG. 7 illustrates a timer thumbwheel board in connection to the motor thumbwheel board.

The apparatus of the invention also has a plurality of thumb-wheel modules serving as inputs to the microprocessor-control of the apparatus. Each thumbwheel module board as shown in FIG. 5-7 has 24 thumbwheels (numbered 0 through 23), divided into eight groups of three. Each group of three defines a single function for the timer module board (see FIG. 5) and possibly several functions for the motor control board (see FIG. 6). The microprocessor control unit of the present invention uses a minimum of two thumbwheel boards, one a timer module board and one a motor control board, and may use up to a maximum of six thumbwheel boards, five timer boards and one motor control board, in the event of a larger number of functions requiring timer control.

Figure 10A:
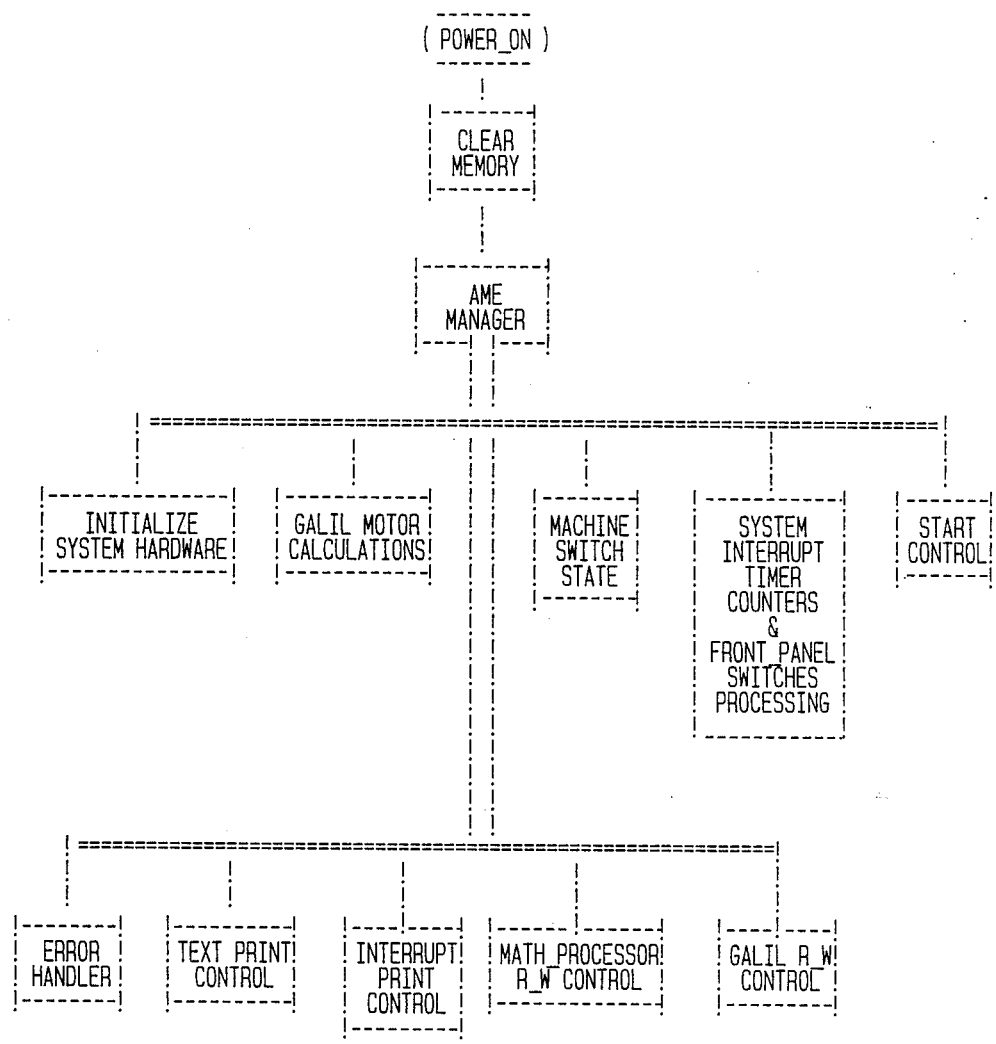
FIGS. 10A–10C are flow diagrams of the control unit of the invention.
Figure 10B:
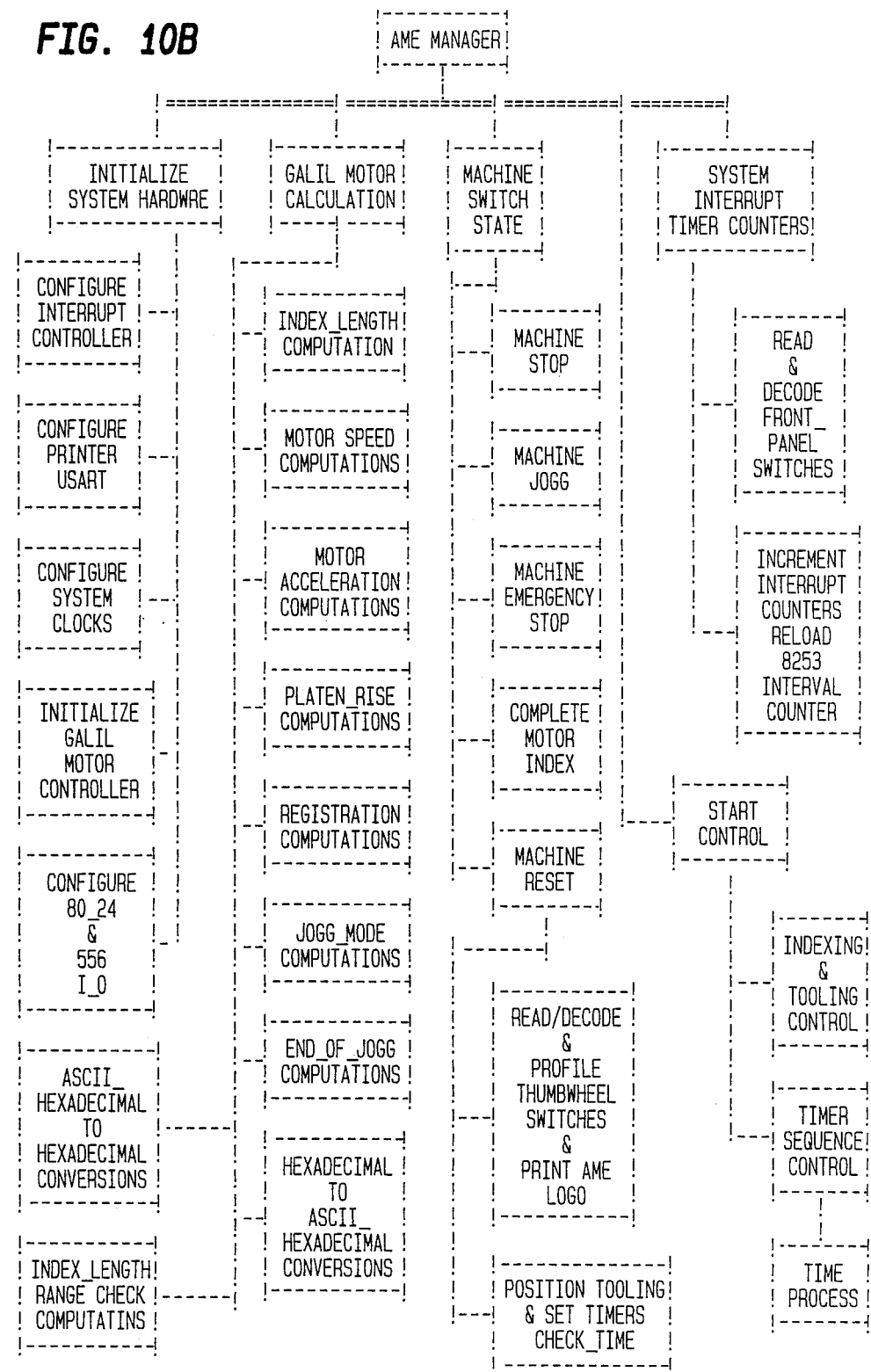
Figure 10C:
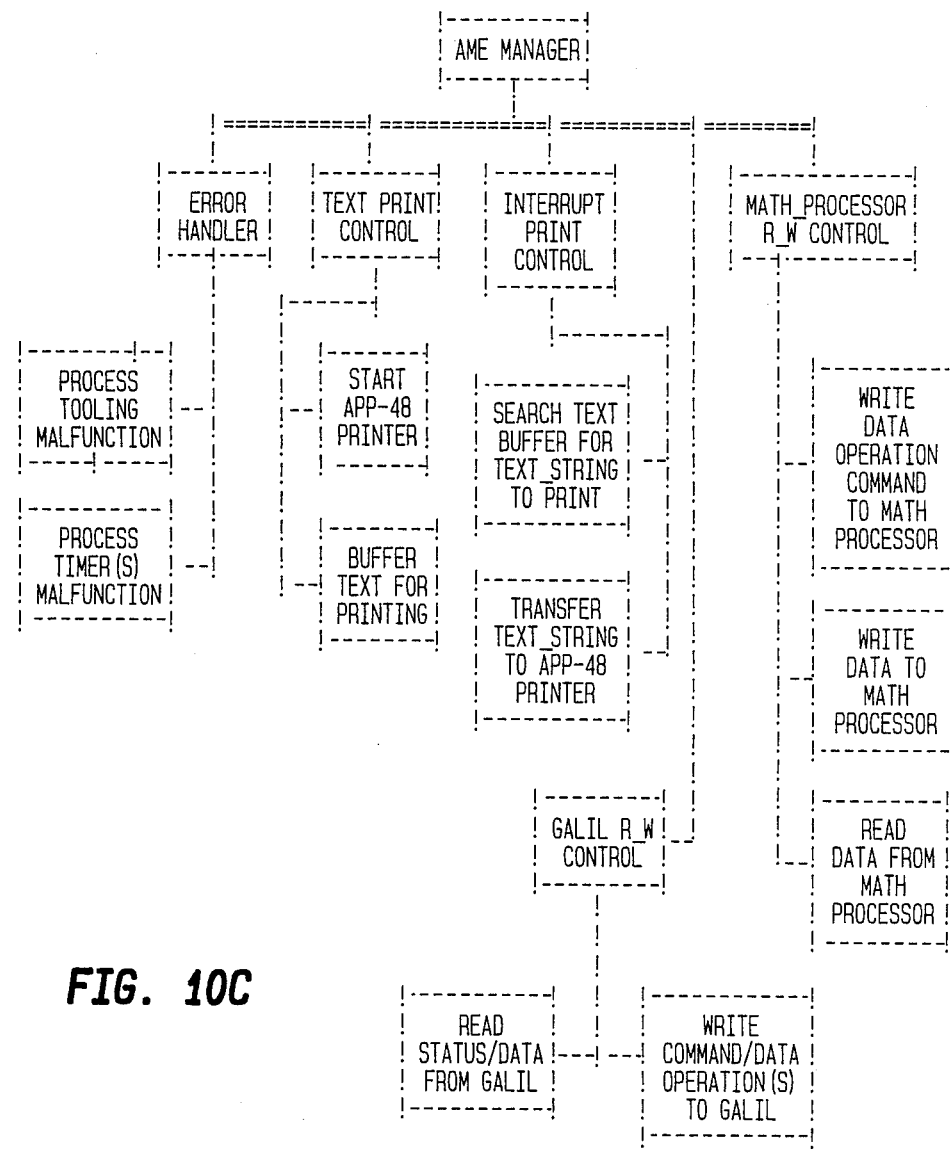
Figure 11:
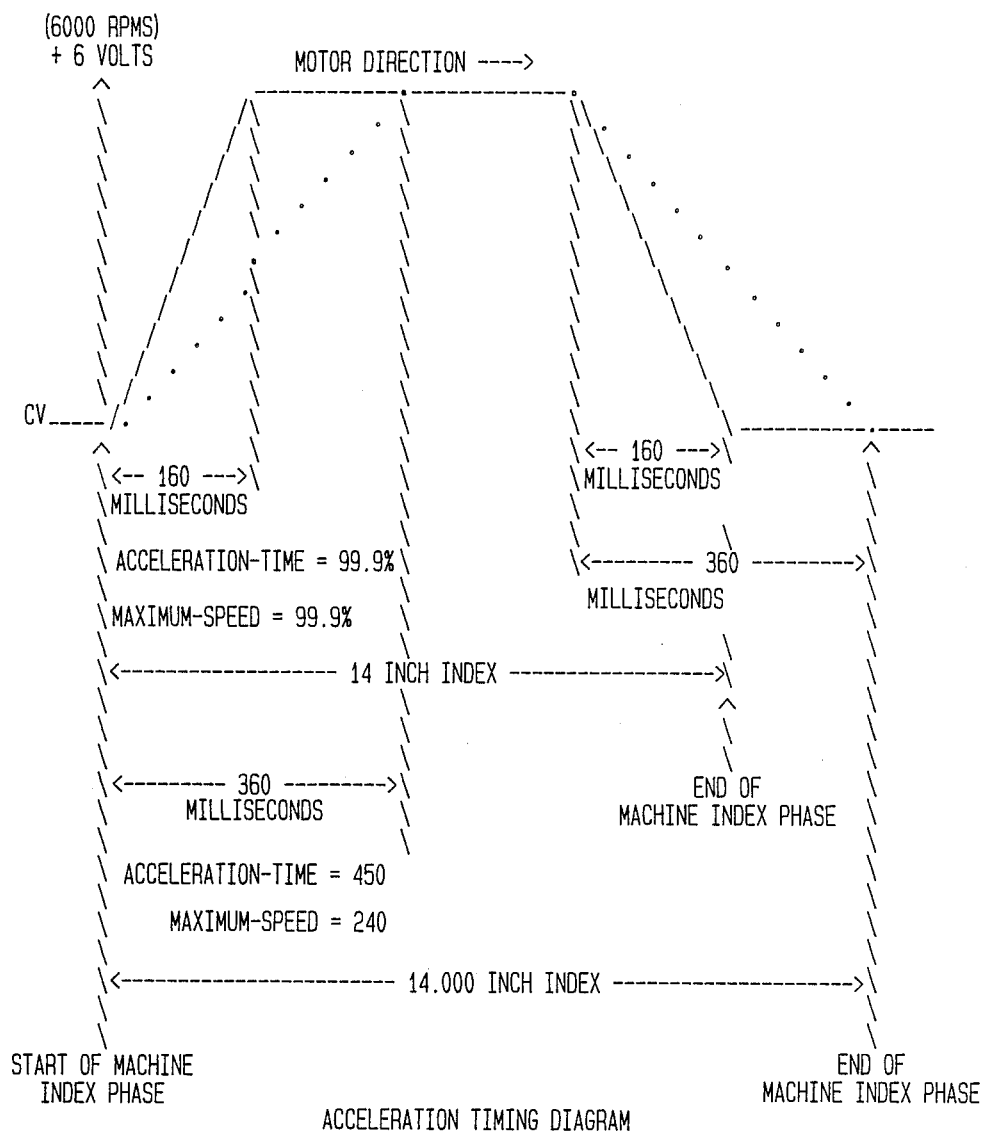
FIGS. 11–16 are diagrams of various motor parameters monitored and controlled by the invention.

The above switches are all part of the input processing into the microprocessor control unit, as shown in FIG. 10A-10C, illustrating the hierarchical flow chart of the controlled events, according to the invention, as part of the "Machine Switch State" branch thereof, shown in detail in FIGS 10B.

Each thumbwheel module board has six jumper pad sockets. A board is connected to the control unit by inserting the shorting plug in the appropriate jumper pad socket, in conventional manner. The example shown herein uses three timer module boards (one is the minimum for system operation) and one motor control board (mandatory), leaving expansion possibilities for two additional timer module boards. The jumper pad sockets 1, 2, and 3 in this example identify boards 1, 2, and 3 respectively, and concomitantly timer 0–3, 4–7, and 8–11, respectively. In the event of expansion, if boards 4 and 5 were added, timers 12–15 and 16–19 would thusly be made available. The jumper pad socket 6 is used to identify the motor control board to the control unit, regardless of the number of timer boards in place. FIG. 7 depicts two boards, one timer board and the motor control board, connected in sequence according to the above requirements.

Before discussing the timers in greater detail, the components of the control unit of the computer is described. The hardware items are chosen on the basis of current market availability. Into the 4-slot card cage (#144080) are inserted the X556 Optical Isolated Programmable Computer Board #1001136 (slot 4), the DMC-201 Galil Motion Control Board #D8-I8-VO (slot 2), and the 80/24 CPU Board #1003137 (slot 1). The (50 pin) ribbon cable #60000J2- 2 is connected to 556 I/O Board (#1001136) J2 edge. Ribbon cable #50000J1-1 (50 pin) is connected to 556 I/O board #1001136 JI edge. Ribbon cable #50000J2-2 (50 pin) is connected to thumbwheel adapter board #1001136 J2 edge. Ribbon cable #40000J3-1 (26 pin) is connected to DMC-201 board #D8-I8-VO J3 edge. Ribbon cable #40000J3-2 (26 pin) is connected to MacGregor (26 pin) male header. Ribbon cable #10000J1-1 (50 pin) is connected to 80/24 board #1003137 J1 edge. Ribbon cable #10000J1-2 (50 pin) is connected to TBO edge connector. Ribbon cable #20000J2-1 (50 pin) is connected to 80/24 board #1003137 J2 edge. Ribbon cable #20000J2-2 (50 pin) is connected to TB1 edge connector. Ribbon cable #30000J3-1 (26 pin) is connected to 80/24 board #1003137 J3 edge. Ribbon cable #30000J3-2 (26 pin) is connected to Micropatch RS-232 Interface Adapter (26 pin) female end to rear end of plug of the APP-48 printer. Lastly, the +24 Volt cable is connected to the thumbwheel adapter terminals (left terminal +24 V, right terminal −24 V). All of the above are conventional and well-known.

There are five machine modes of operations corresponding to the five main front panel control switches: Emergency Stop, Jog, Reset, Start, and Stop. The operator selects one of these functions by pressing the appropriate button; the computer remains in the selected mode until another switch has been pressed. FIG. 8 shows the options possible at any given time. EMERGENCY STOP: This switch is used to suspend all machine operations at their present state. In addition, the computer will automatically execute emergency stop operations if the protection cover is removed or a motor failure is detected. In an emergency stop, the emergency stop lights are turned on, the motor is immediately halted, the conveyer and slitter knives outputs are turned off, and the forming and sealing tools are positioned down. When the computer has completed emergency stop operations the emergency stop lights will be flashed. JOG: The present invention is currently outfitted with four machine jog modes, Jog-0 through Jog-3 (see FIGS. 13–16). The jog modes are primarily used to position and align the bottom and top web films. The particular jog mode executed depends on the setting of thumbwheel 13 of the motor control board. In general, while the jog button is depressed, the computer flashes the jog light and moves the bottom web film (direction depends on jog mode selected) until the bottom is released. The jog function is described in greater detail later. RESET: This switch is activated by the operator to enter the thumbwheel board set-up controls to the computer, to restart the machine after clearing emergency stop, or in conjunction with machine jog operations. If the computer was in the jog mode or emergency stop mode when Reset was pressed, the computer will complete the particular mode of operation before the reset procedure is started. The reset procedure itself is as follows. The front panel ready light is turned on, indicating the computer is executing machine reset procedures. The conveyor and slitter knives are turned on, if not already so. The thumbwheel module board set-up controls are read into the computer. If the profile control was set and the front panel printer switch is on, a hard-copy printout of the thumbwheel board set-up parameters is printed. Next, the forming tool-up and seal tool-up output signals are turned on, positioning the tools up. The seal heater output is turned on, to seal the two films together, for the length of time set on the seal heater duration time thumbwheel. The tool's positions are now checked. If either tool was not detected up, an error message is printed identifying the tool by name and function wherein the error was detected. Next, the forming tool-down and seal tools-down outputs are activated, positioning the tools down. The computer waits one second and checks the positions. If either tool was not detected in the down position, the appropriate error messages are generated on the printer. If no machine failures or errors were detected, then at the completion of printing the ready light is flashed indicating to the operator that another mode may now be entered. START, STOP: The Start switch begins the operations with the index phase (advancement of film). The computer begins the start mode by turning on the front panel run light and cycling through the motor indexinig phase. Upon successful (no error conditions detected, no emergency stops) completion of the time phase, the unit begins indexing once again. During the index phase, the control unit continuously monitors motor index positions and performance, synchronizing motor positions with the start of the film and tooling outputs controls, and checks for stop, emergency stop, and protection cover switch inputs. As motor position reads take place, if the motor's position equals the tools up setting, the forming tools and sealing tools up signals are turned on. If the position read equals the film registration window set-up, the film eye marker search window is opened. If the position read equals the film stretch settings, the film retard output signal is turned on. The index phase continues until the bottom web film has been advanced to the index length position set on the thumbwheel board.

The timer phase starts upon successful completion of the index phase. During the timer phase, the emergency stop, stop and protection cover switch inputs are continuously monitored. When the timer phase begins, the film registration window is closed and the internal ten millisecond clock is started. The internal clock is continuously read and compared with the start-time and duration time control settings of each timer in the system. If the internal clock and a timer's start time are equal, that timer's output is turned on. If the internal clock and a timer's duration time are equal, that timer's output is turned off. When the seal-heater output has been turned off, indicating that the package has been sealed, the film retard output is turned off. The forming and seal tool up positions are checked. If either tool was not detected in the up position, an appropriate error message is printed. The timer phase continues until the timer with the latest duration time has completed. The stop switch is used to halt machine operations in a non-emergency fashion. At the completion of the timer phase, the front panel stop light is turned on and the forming and seal tools are positioned down. The computer waits for the motor to stop before flashing the stop light, indicating that the machine stop procedure has been completed. The conveyer and slitter knives output signals remain one during the stop mode. Machine operations are resumed with the start button.

As mentioned, up to five thumbwheel timer boards may be used, depending on the number of junctions needed to be timed. Sample functions might include forming-air assist, heating air-assist, gas flashing, seal heater, and venting. Each timer has two functions associated with it: The start time, and the duration time (see FIG. 5). When, during the timer phase of machine operations, the internal clock, having started the timer phase at zero, reaches the start time indicated by any of the start times on the thumbwheel boards, that activity is activated. When, after activation, the internal clock registers that the quantity of time indicated by that timer's duration time setting has elapsed, then the output for that timer is turned off. In this manner, all of the functions of the system are timed. Referring to FIG. 5, timer 1 for example is defined by thumbwheels 3, 4, and 5 representing the start time, the three digits representing times ranging from 0.00 through 9.99, omitting the decimal point, and the timers 15, 16 and 17 immediately below would similarly represent the duration time. Any timer with a 0.00 start time or duration time will not be activated. In order to enter new time settings into the control unit, after the timers are adjusted, the reset switch must be pressed, until which point the controller retains the old time settings regardless of the changed readings on the thumbwheels.

Figure 12:
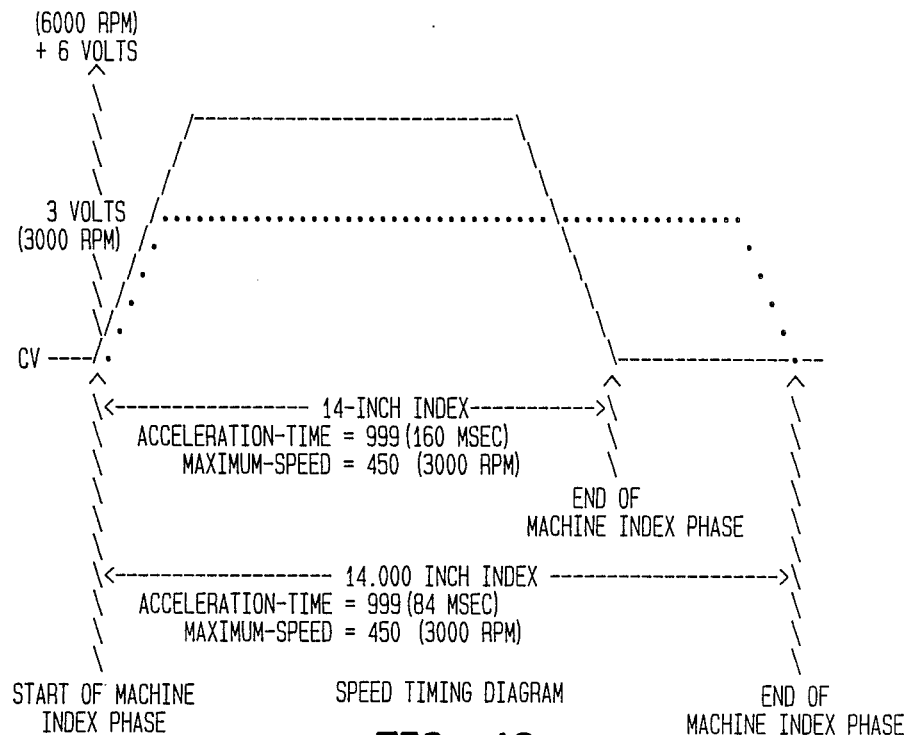
Figure 13:
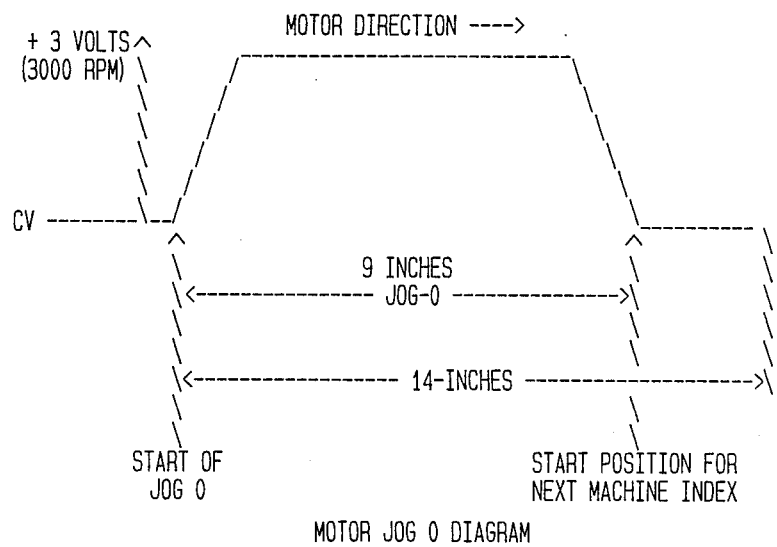
Figure 14:
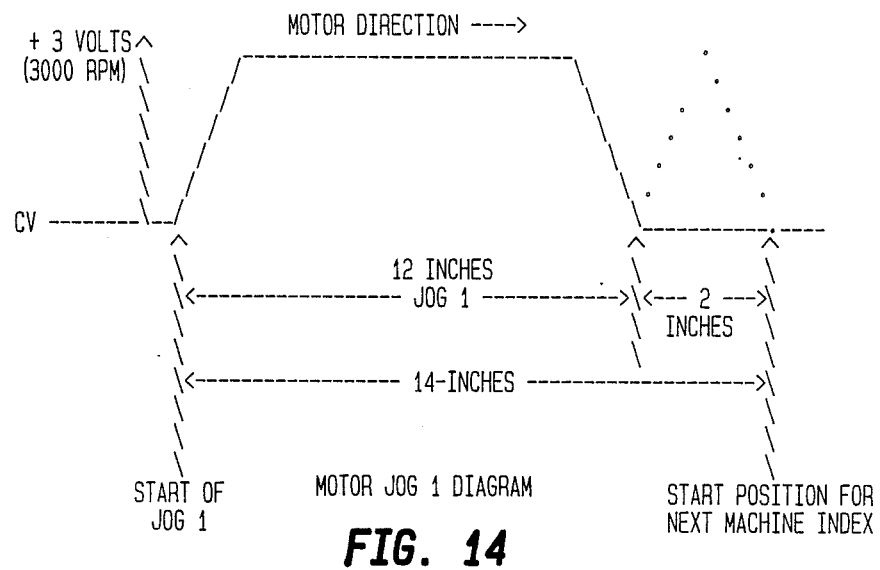
Figure 15:
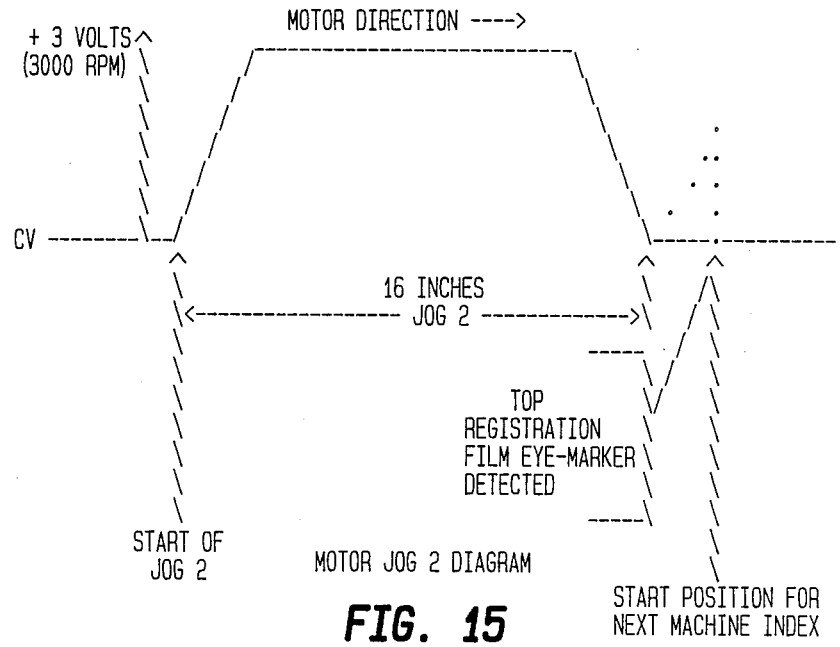
Figure 16:
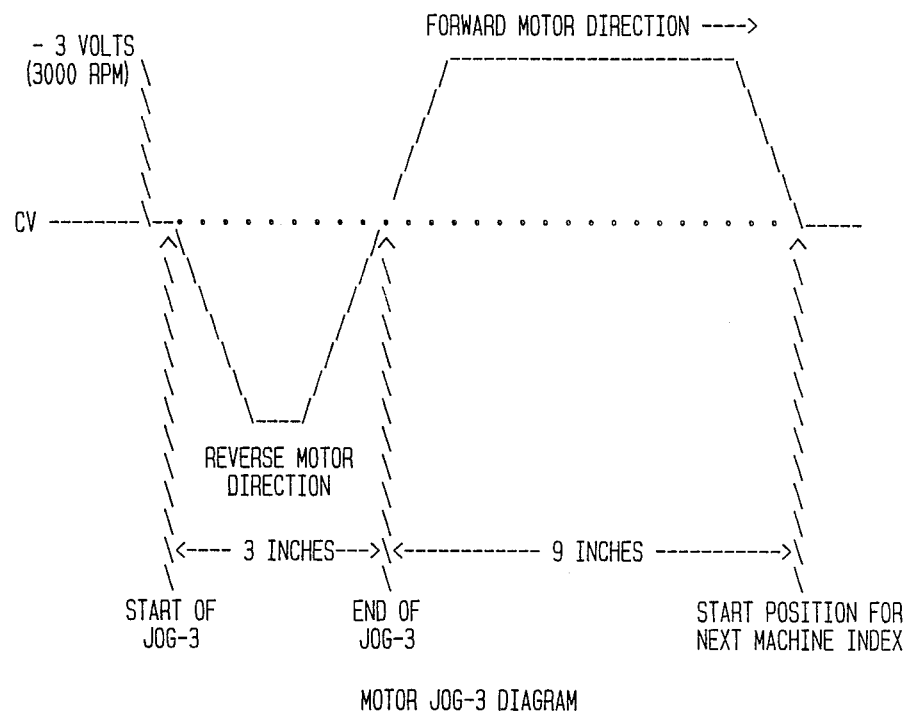

In discussing the setting of the motor thumbwheel board, FIG. 6, discussed are only the functions, as the setting (followed by the use of the reset switch) remains identical as in the use of the timer thumbwheels. The five thumbwheels 19 through 23 are used to instruct the computer as to the exact index length to be used in machine operations. The decimal point belongs between wheels 20, and 21, leaving three fractional digits. The valid range for index length is from 5 (5.000) to 32 (32.000) inches, which would be represented on the board as 05 000 through 32 000. Entries less than 5 inches revert to 5, greater than 32 revert to 32. Wheels 9, 10, and 11 designate the maximum motor speed to be used in machine indexing (see FIG. 12), which will regulate the time required for machine index. The maximum speed is entered as a percentage of the total motor maximum speed (for example 6000 rpm) and ranges from 100 (10%) through 999 (99.9%). An entry less than 100 (10%) will revert to 250 (25%). In addition to motor speed, the unit has an entry for maximum motor acceleration time (see FIG. 12), delineated by thumbwheels 6, 7, and 8. The acceleration time controls the amount of machine jerk that will occur during the operation of the machine. The acceleration time is entered as a percentage of the motor maximum ramp up time and ranges from 100 (10%) to 999 (99.9%), and entries under 100 revert to 250 (25%). Thumbwheel 13 identifies to the control unit which of the four jog modes is to be exercised upon usage of the jog switch. Digits 0 through 3 are used to represent these four modes; entries above 3 default to 0. In all of the modes, the motor is started at a slow speed all while the jog button is depressed (direction dependent upon mode). When the reset switch is subsequently pressed, the machine responds in a manner particular to the jog mode selected. Jog mode 0 is used to set a new bottom web film start position for the next motor index. The operator holds the jog button until the motor has advanced partially through the index length to the desired distance. Then, when the reset button is pushed, ending jog 0, the computer will execute machine reset procedures and use the current bottom web film position as the starting point for the next machine index cycle. Jog-1 is a correction mode used by the operator for the bottom web film. After holding the jog button and advancing the film partially through the machine index length, by pressing the reset button the computer advances the film the remaining distance to the next index point (without changing the reference point as done in jog 0). Jog 2 is used to align the bottom web film with the top web film registration eye marker for the next index cycle. After manually advancing the bottom film a desired distance by holding the jog button and releasing, pressing the reset button advances the bottom web film forward until the top film registration eye marker is detected and executes machine reset procedures. Jog 3 is a film jam clearing mode. As the jog switch is depressed during this mode, the motor moves the film backwards out the beginning of the machine. When the reset switch is pressed ending the jog mode, the computer jogs the bottom web film forward to the position where the film was before the machine was jogged backwards.

Next discussed are thumbwheels 0, 1, and 2, the "tools-down" start time. As mentioned above, the invention allows the forming and sealing tools to go down not necessarily at the end of the timer phase, the latest possible moment, further delaying the beginning of the index phase when the tools are down, but allows them to go down at an earlier time, in advance of the finish of the timer cycle. This is a time delay entry, which starts when the timer phase begins. This time delay determines how long the computer will wait before activating the forming tools and sealing tools signals. This time entry ranges from 000 (0.00 seconds) to 999 (9.99 seconds). A zero "tools-down" entry will cause the "tools-down" signal to be turned on at the beginning of the timer phase. As with all of the thumbwheel settings, the reset switch is pressed to enter the settings into the computer. The "tool-up" entry, thumbwheels 3, 4, and 5, is a motor-position entry. This entry determines the position from the end of the machine index at which the "forming-tools-up" and "sealing-tools-up" output signals are to be turned on during the machine indexing cycle. The "tools-up" entry ranges from 000 (for 0.00 inches) through 999 (9.99 inches), and a zero entry (or greater than the machine index entered) will cause the "tools-up" signal to be turned on at the end of the machine index phase, generally the least efficient technique, as discussed in the introduction. Thumbwheels 15, 16 and 17 address the film controls. Wheels 15 and 16 are for the film registration window, and have entries ranging from 00 (0.0 inches) to 99 (9.9 inches) representing the distance from the end of the index cycle at which the computer will begin searching for the conventional top web-film eye-marker, which is used for aligning the designs or writing on the top and bottom film webs. This is a function already existent in the prior art. The purpose of this function, as opposed to allowing the photocell to scan for the film eye-marker continuously, is that stray marks on the top web film could accidentally trigger the system. The technique here implemented only scans for the presence of the eye-marker at the time when it is most likely to be occurring based on its known location on the film web. A zero entry or an entry greater than the index length entered will disable the film eye marker searching. Thumbwheel 17 is the film-stretch or retard setter in whole inches, which tells the computer when to turn on the film-retard output signal during the following machine timer phase.

Three thumbwheel functions of the motor control board remain to be described. Number 18 is not currently used. Number 12, when non-zero, causes the computer to print out the system profile of all the current thumbwheel settings each time the reset switch is pressed. Thumbwheel 14 controls the system's diagnostic mode, in which the operator is able to make some manual cross-checking of the machine's performance. On its own, the computer continually monitors motor performance, timer inputs and outputs, tool positions and protection covers. But the nine diagnostic modes, 1 through 9, allow some additional tests to be performed.

To enter the diagnostic mode, the desired mode is selected with the thumbwheel. The computer remains in diagnostic mode until a zero is entered in the thumbwheel and the reset button is pushed. Diag-mode 1 is a motor position check for jog-1. When this test is selected, the reset switch pushed, the motor jogged, and the reset pressed again ending jog-1, the computer will print the actual distance the motor was jogged (in pulses per inch), the distance required to reposition the bottom web film for the next index, and the motor acceleration and speed control parameters (in hexadecimal). Diag-mode 2 is unused. Diag-mode 3 is a motor-position check for jog-3, operating just like diag-mode 1. Here, the output provided by the computer is the actual distance the motor was jogged in reverse, the distance required to reposition the motor forward to the original position, and the motor acceleration and speed control parameters (in hexadecimal). Diag-mode 4 is a motor-velocity parameter test. When this test is selected and the reset switch is pressed, the computer will print the computed motor parameters (acceleration time and maximum speed) being used to control the motor, which are computed from the entries on the thumbwheel settings. The acceleration time is checked by multiplying the acceleration time thumbwheel setting by 400 and comparing the results with the printout. The speed setting is checked by multiplying the maximum speed thumbwheel setting by 80 and comparing the results with the printout. Diag-mode 5 is a motor index length test. When this test is selectd and the reset button pressed, the computer will print the computed motor index length value (in pulses per inch) used for indexing the motor. This is checked by multiplying the motor index length setting by 2048 and comparing the results with the printout. Diag-mode 6 is a motor synchronization position test used during the machine start mode of operation. When this test is selected and the reset and then start switches pressed, the computer will print the actual distance the motor was indexed (in pulses per inch) and the position within the motor index where the film (registration window and stretch) and "tools-up" start position were turned on (in pulses per inch). Diag-mode 7 is a functional timer output test. When this test is selected and the reset and then start switches are pressed, the computer will turn on each timer's output for one half second and read the status of the timer. The test begins with timer 0 and goes through all connected timers. If the timer's input status indicates that the timer was not on, an error message is printed so indicating. This test is repeated until the reset switch is pressed. Diag-mode 8 is a bottom seal vacuum test. When this test is selected and the reset and then start switches are pressed, the seal tool is positioned up and the bottom seal vacuum output is turned on for the time set on its duration time thumbwheels. When the test is completed, the front panel program-run light is flashed. Diag-mode 9 is a bottom and top seal vacuum test. When this test is selected and the reset and then start switches are pressed, the seal tool is positioned up and the bottom and top seal vacuum outputs are turned on for the time set on their duration time thumbwheels. When the test is completed the front panel program run light is flashed.

Figure 1:
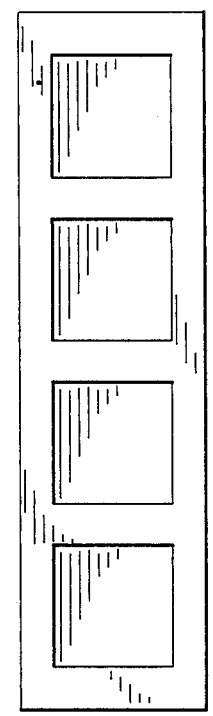
FIG. 1 is a plan view of a single row mold as required by the present invention.
Figure 2:
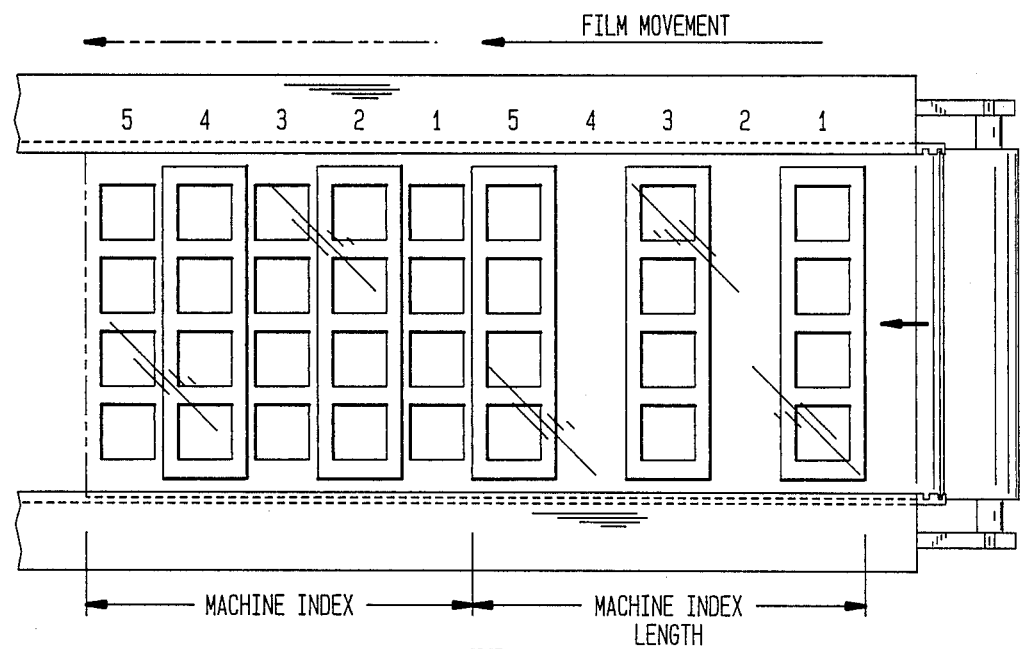
FIG. 2 is a diagrammatic view showing the staggered arrangement of the molds of FIG. 1 according to the present invention.
Figure 3:
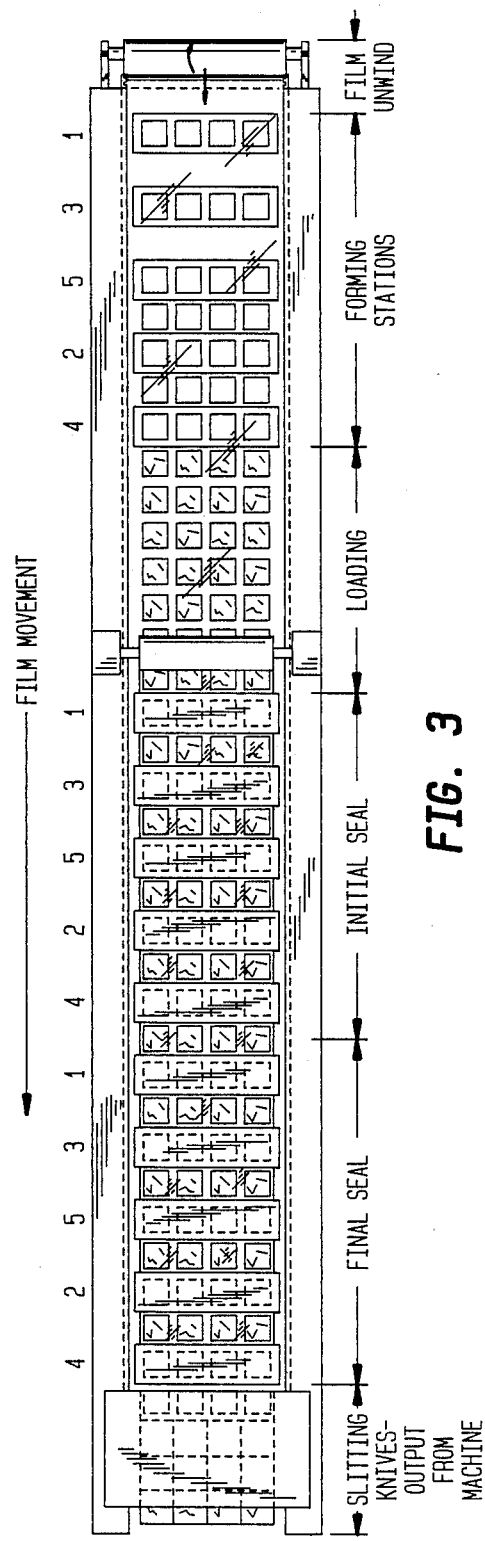
FIG. 3 is a diagrammatical showing of the work-stations of the apparatus according to the invention.

Next in the discussion of the present invention is the aforementioned system of modifications to the forming and sealing stations by which the overall volume of units per cycle is increased through the introduction of a new process of the molds system. As noted previously, simply instituting a giant mold with a greater number of individual molds is not a viable solution. Rather, the present invention calls for the use of individual molds placed in staggered sequence for convenience of clearance. Since, as mentioned, there is some overhead needed on either side of the molds, the molds normally cannot be juxtaposed in immediate succession. Rather, they are placed with a gap between them equally as large as a mold. In order not to waste 50% of the film by leaving this space unused, there are two forming work-stations. Referring now to FIG. 2, which shows the package-forming stations, an example of five molds is used of, for example, four balognas along the width of the machine, with machine indexing going from right to left. Each numbered rectangle of the diagram represents one mold of four bologna packages of FIG. 1 placed lengthwise along the width of the machine, as shown. In this diagram, the first station comprises the rightmost five rows, in which first station those rows numbered 1, 3, and 5 would be provided with a mold of FIG. 1. The remaining two rows 2 and 4 at this first station would not be provided with a mold. At the completion of the timer phase for this station, the film is indexed and new film advances to the first station to have mold-positions 1, 3, and 5 formed. The previous film at the first station will now be at the second station, where rows 2 and 4 thereof are provided with a mold, with rows 1, 3 and 5 empty. Thus, as the film is indexed another time, the film which leaves the second forming station will consist of all 5 (in this example) rows of formed product compartments without any unused space between them. Each mold is preferably moved up and down by a pair of arms, one at each end of the mold. Such are conventional in the art. Levelness of the two ends of the mold is essential to proper operation of the forming and sealing tools, however.

Figure 9:
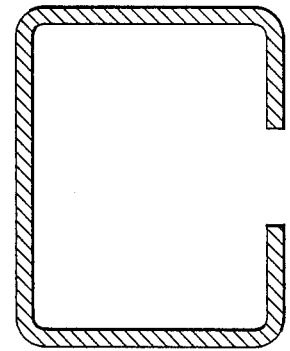
FIG. 9 shows an initial seal in which the seal is not completed at the location in which the gap in the base line occurs.
Figure 4:
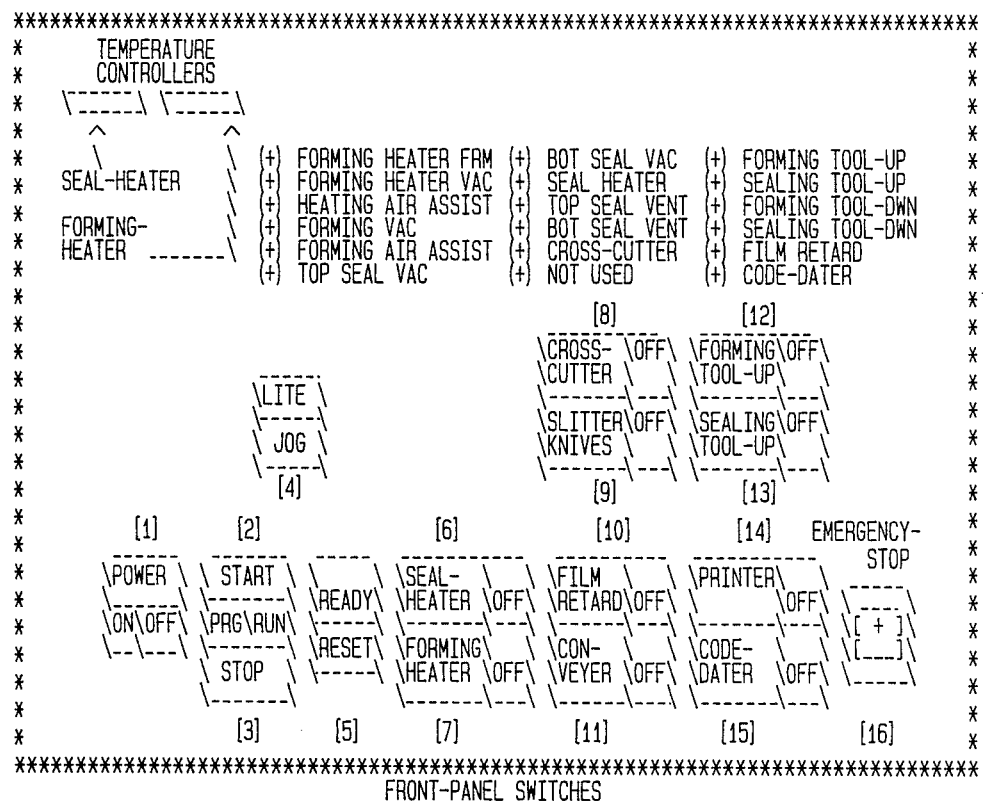
FIGS. 4 are diagrammatical showings of the configuration of the main control panel of the control unit and the locations of the control switches.

The present invention, instead of having a single sealing station downstream of the two forming stations, has two sealing stations: An initial seal station and a final seal station. FIG. 9 shows a partial seal about the package, with a small segment of the perimeter unsealed. The means for achieving such a partial seal are conventional and well-known. In a conventional apparatus using one sealing station, the vacuum would take approximately 1.25 seconds, the seal 1.25 seconds, and the venting about 0.25 seconds, for a total of 2.75 elapsed time. However, according to the invention, the initial seal does not require a vacuum; what takes place is merely heat sealing of the package's perimeter leaving a small segment unsealed, as shown in FIG. 9. This would require about 1.0 seconds. Then, at the next station, due to the fact that the present invention utilizes single-row molds which occupy a smaller volume of space, the separate and relatively-smaller vacuum apparatus at the final sealing station would only require on the order of 0.4 seconds. The final seal itself, required only to seal the small segment not sealed by the initial seal, would take only 2.5 seconds, since a greater heat can be used than in the first seal, since only a part of the entire perimeter is being sealed. The venting, also, would only take 0.1 seconds in the small chamber. Thus, the initial seal station would require only 1 second total time elapsed, and the final seal station would only require 0.75 seconds, and so it is advantageous to implement this technique in a machine so outfitted with the time saving features of the present invention. Preferably, the unsealed length left at the first initial sealing station is between 10% and 15% of the total perimetric length of the sealed part of the package. In accordance with this, instead of one large vacuum chamber for creating a vacuum in the plurality of receptacles of each mold, a plurality of individual vacuum forming chambers with each having its own vacuum source is provided, it being understood that each vacuum chamber by itself is conventional and well-known the art, the present invention, however, utilizing a plurality of such conventional vacuum chambers for the plurality of packages formed by each mold.

What is claimed is:

1. In a die-less product-packaging machine comprising a film-storage means for unwinding film, a film-forming station where packages are formed for storing products, a product loading-station where products are placed into the packages formed at said film-forming station, a heat-sealing station where the product-loaded formed-packages are covered with a cover-sealing film, and means for indexing the film from one said station to the next, said means for indexing comprising conveyor means and a motor means for moving said conveyor means, the improvement comprising:

computer-control means for controlling the operation of said means for indexing and for actuating said film-forming station and said heat-sealing station, said computer-control means actuating each of said film-forming station and said heat-sealing station in direct relationship to the position of said motor means; said computer control means actuating each said film-forming station and said heat-sealing station during operation of said motor means while said conveyor means is still conveying, whereby time-saving and greater productivity is achieved.

2. The improvement according to claim 1, wherein each of said stations comprises work-station tool means reciprocally movable toward the film for operation thereon, and away from the film after said operation thereon, said computer-control means moving said work-station tool means toward the film for a specified time interval before the film has been completely indexed by said means for indexing, so that said time-saving is achieved, each said work-station tool means being moved away from said film before said means for indexing has started conveying said film.

3. The improvement according to claim 2, wherein said film-forming station comprises a first substation comprising three spaced-apart molds, the space between adjoining said molds being approximately equal to the width of a said mold; and a second substation comprising two spaced-apart molds; said two molds of second substation operating on the portions of the film-web not formed into a package at said first substation.

4. The improvement according to claim 3, wherein each said mold comprises one linear row of a plurality of mold-receptacles, each said mold-receptacle having a vacuum-forming opening by which said work-station tool means of said film-forming station may form a portion of said film positioned therein into a package.

5. The improvement according to claim 1, wherein said sealing station comprises a first initial-seal substation for sealing most of the perimeter of the package via a cover-film, and a second final-seal substation spaced downstream from said first initial-seal substation for finishing the seal of the package, said sealing work-station tool means comprising seal substation comprising sealing means for sealing only the portion of the cover-film not sealed to the package at said first initial-seal substation.

6. The improvement according to claim 2, wherein said sealing station comprises a first initial-seal substation for sealing most of the perimeter of the package via a cover-film, and a second final-seal substation spaced downstream from said first initial-seal substation for finishing the seal of the package, said sealing work-station tool means comprising vacuum-forming means at said final-seal substation, said final-seal substation comprising sealing means for sealing the portion of the cover-film not sealed to the package at said first initial-seal substation.

7. The improvement according to claim 2, wherein said film-forming station comprises a first substation, and a second substation located downstream of said first substation, each said first and second substation defining a plurality of mold-row locations, each said row-mold location extending widthwise in a direction transverse to the direction of movement of said means for conveying; each of said first substation and second substation comprising a plurality of linear molds spaced apart along the respective said substation such that a first set of alternate ones of said mold-rows has said linear molds associated therewith, and a second set of alternate ones of said mold-rows is free of said linear molds; one of said first sets defining odd-numbered mold-rows, and the other of said first sets defining even-numbered mold-rows.

8. The improvement according to claim 6, wherein said film-forming station comprises a first substation, and a second substation located downstream of said first substation, each said first and second substation defining a plurality of mold-row locations, each said row-mold location extending widthwise in a direction transverse to the direction of movement of said means for conveying; each of said first substation and second substation comprising a plurality of linear molds spaced apart along the respective said substation such that a first set of alternate ones of said mold-rows has said linear molds associated therewith, and a second set of alternate ones of said mold-rows is free of said linear molds; one of said first sets defining odd-numbered mold-rows, and the other of said first sets defining even-numbered mold-rows.

9. In a die-less packaging machine comprising film unwinding means, a web forming station, product loading station, vacuum and sealing means, film slitting and cross cutting means, top web film controlling means, eye marker searching means, molds for forming product-holding receptacles, and means for the raising and lowering of said molds at the forming and sealing stations, a motor having an indexing phase in which the motor causes the film web to traverse the work stations of the machine and a timer phase in which the film remains stationary and the tools and other functions are performed, wherein the improvement comprises:
 a computer controlling and monitoring system for said die-less packaging machine by which all mechanical activities of the said machine are controlled;
 said computer system comprising means for activating and deactivating all functions of said machine associated with film unwinding, film-web forming tool-raising and lowering, sealing tool-lowering and raising, and heating and vacuum operations; said computer system also controlling the means for activating and deactivating slitter and cross cutting knives for separating finished products and means for acitvating and deactivating motor motion in the forward and reverse directions;
 said computer controlling system comprising an output means through which error and diagnostic messages and system parameters may be communicated to operators of said machine; and
 means of operator entry of operational parameters for said machine;
 said computer system comprising means for detecting any and all error situations and malfunctions in tools, motor, and all other hardware components of the system and notifying operator of such circumstance, and of halting machine operations pending correction of said malfunction.

10. The computer control system according to claim 9, wherein said means of operator entry comprises a plurality of thumbwheel switches each of which can be set to any digit between 0 and 9, said thumbwheel switches being of significance individually or as conglomerations of individual digits representing multi-digit figures.

11. The control system according to claims 10, wherein said computer system comprises means for manually controlling slow motor movement for clearing mechanical jams, for resetting a new bottom web film position, for realigning top web film with bottom web film, and means for operating said motor in the reverse direction.

12. The system according to claims 9, wherein said computer system comprises means for performing diagnostic checks and for outputting results of said checks for the operator;
 said diagnostic means comprising means for motor position checks, motor velocity tests, motor index length test, motor synchronization position test, functional timer output test, and vacuum seal tests.

13. The system according to claim 9, wherein said computer system comprises means to issue forming and sealing tools up and tools down control signals at chosen times;
 said chosen times to be chosen as optimal moments wherein tools up signal is issued at a specified point while the motor is still advancing web film wherein said activation of tools up procedure will not be overly premature;
 said signal activating the lowering of the tools down procedure administered by said control system during operations phase in advance of the motor indexing phase in a premature fashion allowing for earliest possible lowering of the tools such that forthcoming motor movement may begin immediately upon tools lowering sufficiently to allow the web film to be indexed without causing interference between tools and previously formed forms.

14. The system according to claim 9, wherein the operational parameters comprises maximum motor velocity and maximum motor acceleration at which the computer system is to operate the machine; said velocity and acceleration maximums being represented as percentages of the motor's total possible capacity.

15. The system according to claim 14, wherein the operating parameters entered by operator switches include the index length for the motor to advance the film web along the machine.

16. A method of forming a vacuum-package, comprising:
 (a) conveying forming-film to a first package-forming station;
 (b) forming a plurality of rows of packages at said first package-forming station such that said rows of packages are spaced apart such that each row is spaced a distance from an adjoining row equal approximately to the width of a linear mold at the first substation;

(c) advancing the film to a second package-forming station;

(d) forming a plurality of rows of packages at said second package-forming station such that said rows of packages are spaced apart such that each row is spaced a distance from an adjoining row equal approximately to the width of a linear mold at the first substation, said rows being formed on those portions of the film web not formed into packages at said first package forming station.

17. The method according to claim 16, further comprising:

(e) advancing the thus-formed packages to a loading station for loading products into the packages;

(f) advancing the loaded packages to an initial-sealing station where a cover-film seal is to be formed;

(g) placing a cover-film over the packages and partially-sealing the cover-film about a majority of the upper perimeter of each loaded package;

(h) advancing the loaded package to a final-sealing station;

(i) creating a vacuum in each of the loaded and partially-sealed packages, and sealing the portion of the package left unsealed during said step (g).

18. The method according to claim 17, further comprising controlling and synchronizing each of said steps (a) through (i) by computer control.

19. The method according to claim 18, wherein said step of controlling and synchronizing comprises initiating each of said steps (b), (d), (g) and (i) during said steps (a), (c), (e), (f) and (h), in order to save time of operation, each said initiation of said steps (b), (d), (g) and (i) being defined by the initial actuation of the work-station tools thereof.

20. The method according to claim 19, wherein said step of controlling and synchronizing comprises terminating each of said steps (b), (d), (g) and (i) before said steps (a), (c), (e), (f) and (h).

* * * * *